United States Patent
Wang et al.

(10) Patent No.: US 10,978,755 B2
(45) Date of Patent: Apr. 13, 2021

(54) COOLING PLATE FOR A RECHARGEABLE ENERGY STORAGE SYSTEM

(71) Applicant: GM Global Technology Operations LLC, Detroit, MI (US)

(72) Inventors: Bao Wang, Troy, MI (US); Andrew K. Chandler, Plymouth, MI (US); David P. Tasky, Farmington Hills, MI (US); Karl C. Dorgan, West Bloomfield, MI (US); Robert J. Heydel, Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 106 days.

(21) Appl. No.: 16/363,527

(22) Filed: Mar. 25, 2019

(65) Prior Publication Data

US 2020/0313260 A1 Oct. 1, 2020

(51) Int. Cl.
| | |
|---|---|
| *H01M 10/6554* | (2014.01) |
| *H01M 2/10* | (2006.01) |
| *H01M 10/613* | (2014.01) |
| *H01M 10/625* | (2014.01) |
| *H01M 2/34* | (2006.01) |
| *H01M 10/6556* | (2014.01) |

(52) U.S. Cl.
CPC ..... *H01M 10/6554* (2015.04); *H01M 2/1077* (2013.01); *H01M 2/34* (2013.01); *H01M 10/613* (2015.04); *H01M 10/625* (2015.04); *H01M 10/6556* (2015.04); *H01M 2220/20* (2013.01)

(58) Field of Classification Search
CPC ......... H01M 10/6554; H01M 10/6556; H01M 2/1077; H01M 2/34; H01M 10/613; H01M 10/625; H01M 2220/20
See application file for complete search history.

(56) References Cited

U.S. PATENT DOCUMENTS

| | | | |
|---|---|---|---|
| 7,892,670 B2* | 2/2011 | Aiello | H02M 7/003 429/120 |
| 8,852,780 B2* | 10/2014 | Kleiman | H01M 10/6556 429/120 |
| 10,056,642 B2* | 8/2018 | Boddakayala | H01M 10/613 |
| 2012/0315521 A1* | 12/2012 | Nissels | H01M 10/0472 429/90 |
| 2013/0280574 A1* | 10/2013 | Kim | H01M 10/6553 429/120 |
| 2016/0036102 A1* | 2/2016 | Suzuki | H01M 10/6567 429/120 |
| 2016/0172726 A1* | 6/2016 | Enning | H01M 10/613 429/120 |
| 2017/0077566 A1* | 3/2017 | Mascianica | H01M 10/625 |
| 2017/0320381 A1* | 11/2017 | Milton | B60K 17/12 |
| 2018/0013111 A1* | 1/2018 | Wuensche | H01M 10/625 |

* cited by examiner

*Primary Examiner* — Michael L Dignan
(74) *Attorney, Agent, or Firm* — Quinn IP Law

(57) ABSTRACT

A cooling system for a rechargeable energy system includes a plurality of bus bars, a cooling plate configured for cooling the plurality of bus bars and disposed in a thermally-conductive relationship with a portion of each of the plurality of bus bars, and an isolation component disposed between and in contact with the cooling plate and each of the plurality of bus bars. A rechargeable energy storage system and device are also described.

18 Claims, 4 Drawing Sheets

COOLING PLATE FOR A RECHARGEABLE ENERGY STORAGE SYSTEM

INTRODUCTION

The disclosure relates to a cooling system for a rechargeable energy storage system.

Electric vehicles often include a rechargeable energy storage system configured to deliver electrical power to one or more propulsion systems and provide motive power. In particular, electrical energy may be stored in a battery pack so that the one or more propulsion systems may alternately draw power from and deliver power to the rechargeable energy storage system as needed.

Often, a battery management system may control current flow to and from the battery pack, and may include a battery disconnect unit. The battery disconnect unit may include electromechanical switches that open or close high current paths between the battery pack and the one or more propulsion systems.

SUMMARY

A cooling system for a rechargeable energy storage system includes a plurality of bus bars, a cooling plate configured for cooling the plurality of bus bars and disposed in a thermally-conductive relationship with a portion of each of the plurality of bus bars, and an isolation component disposed between and in contact with the cooling plate and each of the plurality of bus bars.

In one aspect, the cooling plate may have a first inlet and a first outlet and may define a plurality of channels therein each configured for conveying a fluid through the cooling plate between the first inlet and the first outlet to thereby conduct thermal energy away from the plurality of bus bars.

In another aspect, the cooling plate may be electrically isolated from the each of the plurality of bus bars by the isolation component.

In a further aspect, the cooling plate may have a first face disposed opposite and parallel to the portion of each of the plurality of bus bars, and the isolation component may be disposed along an entirety of the first face. The cooling plate may have a top end adjacent the first face and the isolation component may contact and wrap over the top end.

A rechargable energy storage system includes a battery pack including a plurality of rechargeable batteries electrically connected to one another. The rechargeable energy storage system also includes a battery disconnect unit configured for selectively disconnecting electrical power to the plurality of rechargeable batteries. The battery disconnect unit is selectively disposed in electrical communication with the battery pack and includes a plurality of contactors and a cooling system. The cooling system includes a plurality of bus bars electrically connected to one another and configured for electrically interconnecting the plurality of contactors. The cooling system also includes a cooling plate configured for cooling the plurality of bus bars and disposed in a thermally-conductive relationship with a portion of each of the plurality of bus bars. The cooling system further includes an isolation component disposed between and in contact with the cooling plate and each of the plurality of bus bars. In addition, the rechargeable energy storage system includes a cooling hose configured for cooling the battery pack and the battery disconnect unit and disposed in fluid communication with the cooling plate.

In one aspect, the isolation component may include at least one thermally-conductive layer disposed between and in contact with the cooling plate and each of the plurality of bus bars. The cooling plate may be electrically isolated from each of the plurality of bus bars.

In another aspect, the cooling plate may have a first inlet and a first outlet and may define a plurality of channels therein between the first inlet and the first outlet. The plurality of channels may be disposed in fluid communication with the cooling hose. Further, the cooling hose may have a second inlet disposed in fluid communication with the first outlet and a second outlet disposed in fluid communication with the first inlet.

In an additional aspect, the rechargeable energy storage system may include a tray defining a cavity therein. The battery disconnect unit and the cooling hose may be disposed within the cavity and the battery pack may be disposed on the tray.

In one aspect, the tray may include a divider having a wall surface and a rear edge extending from and substantially perpendicular to the wall surface. Further, at least one of the plurality of bus bars may have a first portion that is substantially parallel to the wall surface. The at least one of the plurality of bus bars may also have an end that extends from and is substantially perpendicular to the first portion, and is substantially parallel to the rear edge.

In yet another aspect, at least one of the plurality of bus bars may have an end extending out of the cavity towards the battery pack. The end may be electrically connected to each of the plurality of rechargeable batteries.

In a further aspect, at least one of the plurality of contactors may be a direct current contactor configured for charging the plurality of rechargeable batteries with an electrical current of from 300 Amperes to 500 Amperes. The battery pack may be electrically connected to and configured for powering a device with the electrical current of from 1,000 Amperes to 1,300 Amperes.

In another aspect, the rechargeable energy storage system may further include a coolant pump connected to the cooling hose and configured for reversing a flow of fluid through the cooling hose and the cooling plate from the plurality of rechargeable batteries to the plurality of contactors to thereby warm the plurality of contactors.

A device includes a driven component and a rechargeable energy storage system configured for providing power to the driven component. The rechargeable energy storage system includes a cooling system and a battery pack having a plurality of rechargeable batteries electrically connected to one another. The cooling system includes a plurality of bus bars electrically connected to the battery pack and to one another. The cooling system also includes a cooling plate configured for cooling the plurality of bus bars and disposed in a thermally-conductive relationship with a portion of each of the plurality of bus bars. The cooling system also includes an isolation component disposed between and in contact with the cooling plate and each of the plurality of bus bars.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
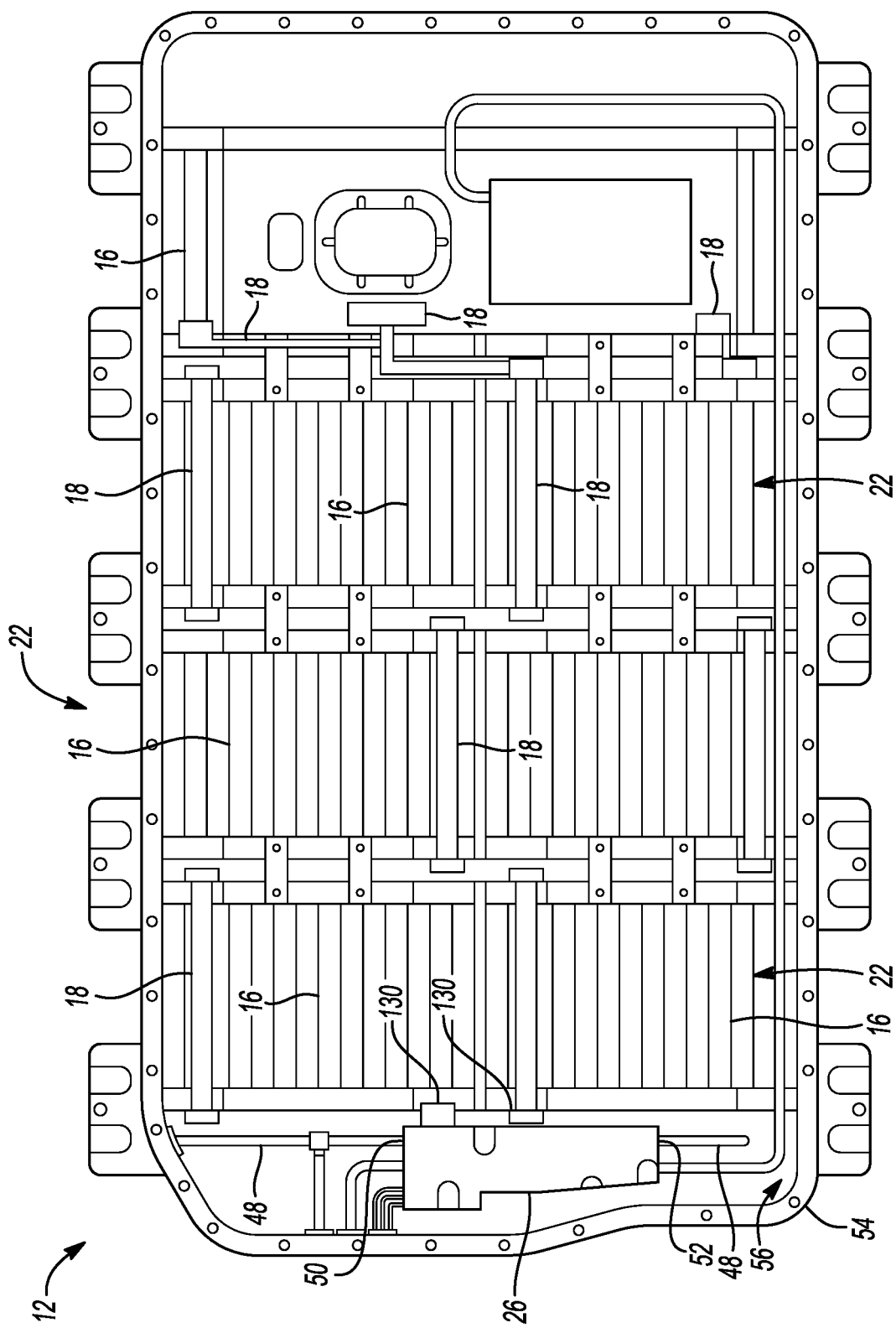
FIG. 1 is a schematic illustration of a top view of a rechargeable energy storage system including a battery pack and a battery disconnect unit that includes a cooling system.
Figure 2:
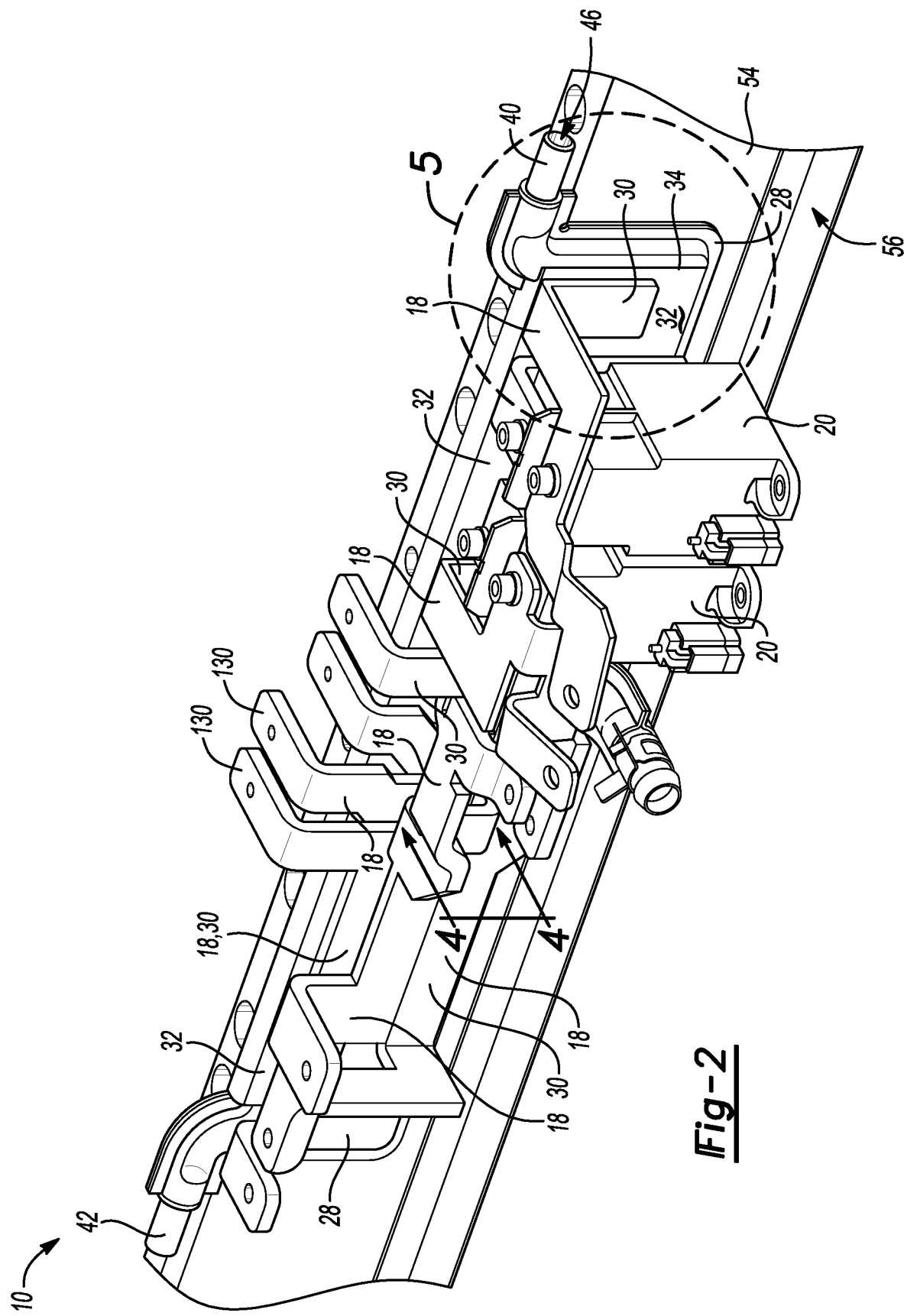
FIG. 2 is a schematic illustration of a perspective view of the cooling system of the rechargeable energy storage system of FIG. 1.

Referring to the drawings, wherein like reference numerals refer to like elements, a cooling system 10 (FIG. 2) for a rechargeable energy storage system 12 (FIG. 1) is shown generally in FIGS. 1 and 2. The cooling system 10 and rechargeable energy storage system 12 may be useful for devices 14 (FIGS. 5A and 5B) requiring rechargeable batteries 16 (FIG. 1) capable of high-power charging, e.g., charging at a current of up to 500 Amperes, and high-power electrical loading, e.g., a current of up to 1,300 Amperes. As set forth in more detail below, the cooling system 10 may enable the rechargeable energy storage system 12 to manage temperatures associated with high-power charging and high-power electrical loading without increasing bus bar 18 (FIG. 2) and contactor 20 (FIG. 2) size. As such, the cooling system 10 may enable a reduction of mass for the rechargeable energy storage system 12. In addition, as described in more detail below, the cooling system 10 may enable selectively reversed coolant fluid flow to assist with battery 16 warm-up during a direct current fast charge mode of operation.

Accordingly, the cooling system 10 and rechargeable energy storage system 12 may be useful for vehicular applications such as, but not limited to, automobiles, buses, forklifts, motorcycles, bicycles, trains, trams, trolleys, spacecraft, airplanes, farming equipment, earthmoving or construction equipment, cranes, transporters, boats, and the like. Alternatively, the cooling system 10 and rechargeable energy storage system 12 may be useful for non-vehicular applications such as stationary and portable power generation and electronics.

By way of a non-limiting example, the cooling system 10 and rechargeable energy storage system 12 may be useful for devices 14 (FIGS. 5A and 5B) such as non-autonomous, autonomous, or semi-autonomous vehicle applications. That is, the device 14 may be a vehicle and the rechargeable energy storage system 12 may be an energy storage system consisting of one or more battery packs 22 (FIG. 1) and necessary ancillary subsystems for physical support and enclosure, thermal management, and electronic control. In various embodiments, the device 14 may be configured as a battery electric vehicle (BEV), an extended-range electric vehicle (EREV), a hybrid electric vehicle (HEV), a plug-in hybrid electric vehicle (PHEV), or another vehicle or system having a high-voltage direct current (HVDC) bus as described below.

In some circumstances, the vehicles or devices 14 noted above may each be powered solely by electrical energy from the rechargeable energy storage system 12 in a mode referred to as electric vehicle (or EV) mode. The rechargeable energy storage system 12 may be embodied as a multi-cell lithium ion or other suitable battery pack 22 having a plurality of rechargeable batteries 16 electrically connected to one another. The HVDC bus may carry a voltage of from about 60 Volts to about 450 Volts or higher depending on the embodiment and/or operating mode. Thus, the term "high voltage" as used herein may be relative to an auxiliary voltage, which may typically be on the order of 12 Volts. The battery pack 22 may be electrically connected to and configured for powering the device 14 with an electrical current of from 1,000 Amperes to 1,300 Amperes. That is, the battery pack 22, rechargeable energy storage system 12, and device 14 may be configured for comparatively high-power electrical loading.

Further, although not shown, the device 14 may include a drive motor and an optional second motor depending on a configuration of the device 14. That is, in one possible embodiment described with reference to FIGS. 5A and 5B, the device 14 may be a vehicle including a driven member 24, such as an axle or wheel, and the rechargeable energy storage system 12 configured for providing power to the driven member 24. In one non-limiting embodiment, the device 14 may be configured as a plug-in hybrid electric vehicle that transmits motor torque from both motors to a respective motor output member and provide power to or drive the driven member 24. Motor torque from a designated motor may also be harnessed to assist the cranking and starting of an internal combustion engine (not shown). Further, motor torque from either or both motors may be used for propelling the device 14 via the respective output members.

Alternatively, in another non-limiting embodiment, the device 14 or vehicle may be configured as a battery electric vehicle (BEV) having just one motor and no internal combustion engine. Either embodiment of the device 14 or vehicle may include a traction power inverter module (not shown) having two power inverters.

Referring again to FIG. 1, the rechargeable energy storage system 12 includes the battery pack 22 including the plurality of rechargeable batteries 16 electrically connected to one another, and a battery disconnect unit 26 configured for selectively disconnecting electrical power to the plurality of rechargeable batteries 16. That is, the battery disconnect unit 26, which may be referenced as a contactor assembly or a relay assembly, may be configured as a primary interface between the battery pack 22 and an electrical system of the device 14. More specifically, the battery disconnect unit 26 may selectively couple, e.g., connect and switch on an electrical supply and disconnect or switch off the electrical supply, from the battery pack 22 to a load and may include a plurality of contactors 20 (FIG. 2), fuses, switches, and electronic components. Further, although not shown, the battery disconnect unit 26 may include, for example, circuit protection devices or fuses, a high voltage connector, an alternating charge connection, a direct current fast charge connection, and the like.

As described with reference to FIG. 2, the plurality of contactors 20 may each be configured as an electrically controlled switch for switching an electrical high-power circuit and may include, for example, a main positive contactor, a direct current fast charge contactor, a pre-charge contactor, a main negative contactor, and/or a direct current fast charge contactor each configured for charging the plurality of batteries 16 during various operating modes. In particular, at least one of the plurality of contactors 20 may be electrically connected to and configured for charging the plurality of rechargeable batteries 16 (FIG. 1) with an electrical current of from 300 Amperes to 500 Amperes. That is, the plurality of contactors 20 may be configured for comparatively high-power charging of the battery pack 22.

Referring again to FIG. 2, the battery disconnect unit 26 also includes the cooling system 10 configured for cooling the rechargeable energy storage system 12 and components thereof. In particular, the cooling system 10 includes a plurality of bus bars 18 electrically connected to one another and configured for electrically interconnecting the plurality of contactors 20. That is, the plurality of bus bars 18 may physically connect to the plurality of contactors 20, e.g., via bolts, and thereby electrically connect to one another and complete an electrical circuit with each of the plurality of rechargeable batteries 16 (FIG. 1). As such, the plurality of bus bars 18 may be electrically connected to the battery pack 22 and to one another such that an electrical current may flow between the battery disconnect unit 26 and the battery pack 22.

Figure 3:
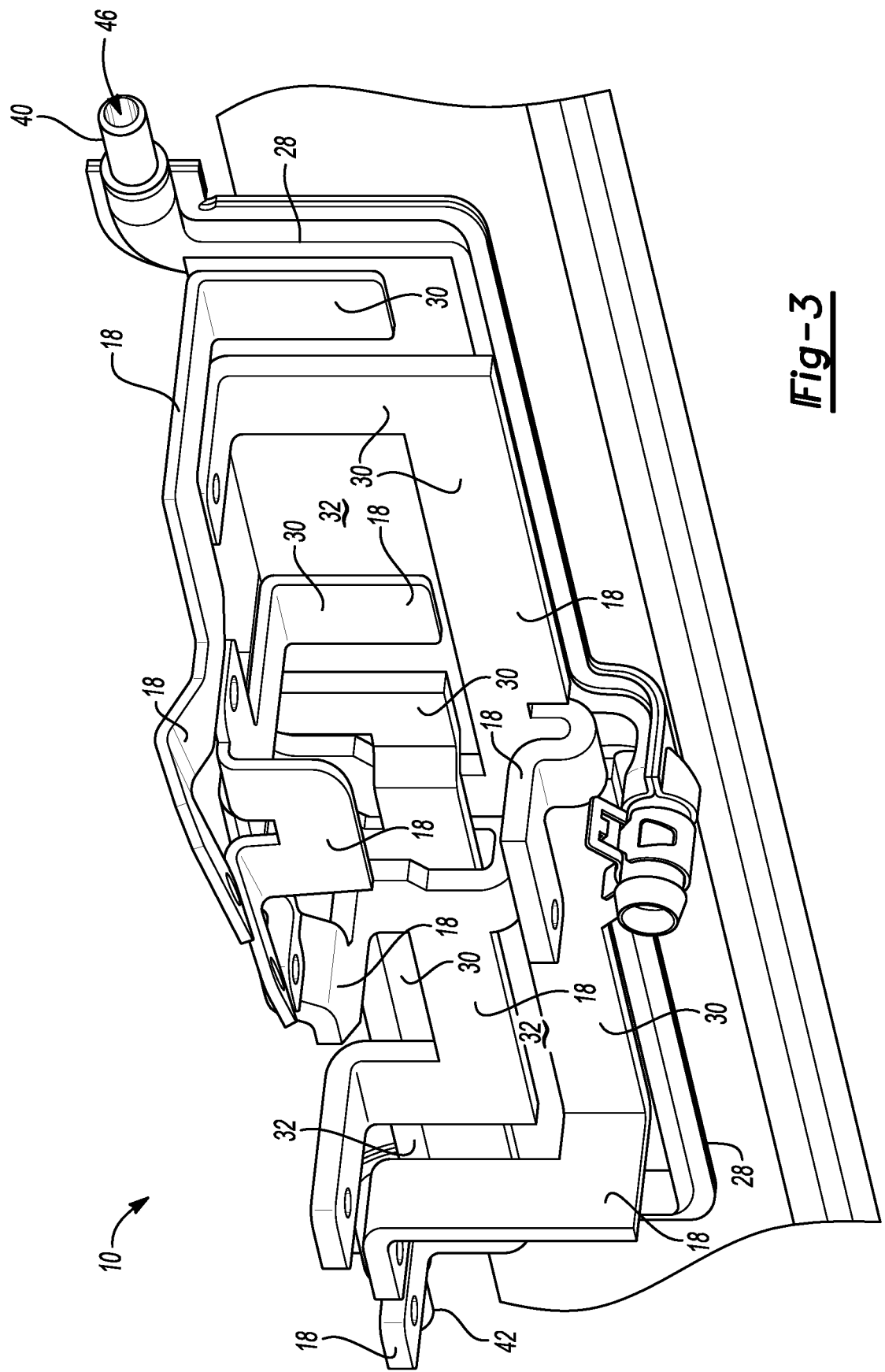
FIG. 3 is a schematic illustration of another perspective view of the cooling system of FIG. 2.

Referring now to FIGS. 2 and 3, the cooling system 10 also includes a cooling plate 28 configured for cooling the plurality of bus bars 18. That is, during operation of the rechargeable energy storage system 12, the battery pack 22 and plurality of contactors 20 may generate heat that is best dissipated for efficient operation of the rechargeable energy storage system 12. To that end, the cooling plate 28 is disposed in a thermally-conductive relationship with a portion 30 of each of the bus bars 18. For example, the cooling plate 28 may be disposed adjacent the portion 30 of each of the plurality of bus bars 18 to dissipate heat away from the plurality of bus bars 18 via conduction. In one non-limiting example, the portion 30 may conduct electrical current. However, in another non-limiting example, the portion 30 may not conduct electrical current, but may instead act as a thermal via to improve heat dissipation from the bus bar 18. For example, as shown in circled portion 5 of FIG. 2, the portion 30 may be an extended portion 30 of the bus bar 18 and may be arranged in the thermally-conductive relationship with the cooling plate 28 to act as one or more thermal vias.

As shown in FIGS. 2 and 3, the cooling system 10 further includes an isolation component 32 disposed between and in contact with the cooling plate 28 and each of the plurality of bus bars 18. The isolation component 32 may include at least one thermally-conductive layer 34 disposed between and in contact with the cooling plate 28 and each of the plurality of bus bars 18. For example, the isolation component 32 may include one or two thermally-conductive layers 34 formed from the same or different material. In one non-limiting example, the isolation component 32 may include two separate thermally-conductive layers 34 to provide redundancy and excellent robustness. Suitable examples of the at least one thermally-conductive layer 34 may include a Mylar® insulated sheet, a thermally-conductive epoxy, a thermal pad, a lamination, and the like. For example, the isolation component 32 may be a lamination disposed on each of the plurality of bus bars 18 such that each of the plurality of bus bars 18 is a laminated bus bar. In one example, the isolation component 32 and cooling plate 28 may be comparatively easy to assemble and compress against the plurality of bus bars 18. For example, the cooling plate 28 and attached isolation component 32 may have a certain configuration or shape, such as a V-shape, to enable efficient and easy assembly of the cooling system 10.

Further, the cooling plate 28 may be electrically isolated from each of the plurality of bus bars 18 by the isolation component 32. That is, the at least one thermally-conductive layer 34 may also be electrically-isolating such that electrical current does not travel between the cooling plate 28 and each of the plurality of bus bars 18.

The isolation component 32 may cover a segment or an entirety of the cooling plate 28. For example, as described with reference to FIG. 4, the cooling plate 28 may have a first face 36 disposed opposite and parallel to the portion 30 of each of the plurality of bus bars 18, and the isolation component 32 may be disposed along an entirety of the first face 36. In addition, the cooling plate 28 may have a top end 38 adjacent the first face 36, and the isolation component 32 may contact and wrap over the top end 38. Therefore, the isolation component 32 may optimize contact with each of the plurality of bus bars 18 and may protect the cooling plate 28 from electrical current.

Further, as best shown in FIG. 2, the cooling plate 28 may have a first inlet 40 and a first outlet 42 and may define a plurality of channels 44 (FIG. 4) therein. Each of the plurality of channels 44 may be configured for conveying a fluid 46, such as air or a coolant, through the cooling plate 28 between the first inlet 40 and the first outlet 42 to thereby conduct thermal energy away from the plurality of bus bars 18. The plurality of channels 44 may be arranged in a suitable configuration to enable, for example, parallel or cross-flow of the fluid 46.

Referring again to FIG. 1, the rechargeable energy storage system 12 also includes a cooling hose 48 configured for cooling the battery pack 22 and the battery disconnect unit 26 and disposed in fluid communication with the cooling plate 28. In particular, the cooling hose 48 may transmit the fluid 46, e.g., air or a coolant, to a plurality of conduits (not shown) disposed beneath the plurality of rechargeable batteries 16 to thereby cool the battery pack 22 during operation.

Further, with respect to the battery disconnect unit 26, the plurality of channels 44 (FIG. 4) defined by the cooling plate 28 may be disposed in fluid communication with the cooling hose 48 such that the fluid 46 may flow through the cooling plate 28 to effectively dissipate heat from the plurality of bus bars 18. Such heat dissipation may prevent an increase in bus bar 18 and/or contactor 20 (FIG. 2) size since the cooling plate 28 may remove thermal energy from the plurality of bus bars 18 and plurality of contactors 20 without an increased surface area of individual bus bars 18 and/or contactors 20.

In particular, as best described with reference to FIG. 1, the cooling hose 48 may have a second inlet 50 disposed in fluid communication with the first outlet 42 and a second outlet 52 disposed in fluid communication with the first inlet 40. As such, the fluid 46 that is routed throughout the rechargeable energy storage system 12 as described above may also be routed through the cooling plate 28 via the plurality of channels 44. Therefore, comparatively cool fluid that has not yet be transmitted to the plurality of rechargeable batteries 16 may first cool the plurality of bus bars 18 and dissipate heat from the battery disconnect unit 26 via the cooling plate 28.

Referring again to FIG. 1, the rechargeable energy storage system 12 may also include a tray 54 defining a cavity 56 therein. The tray 54 may be configured for supporting the components of the rechargeable energy storage system 12. In particular, the battery disconnect unit 26, including the cooling plate 28, and the cooling hose 48 may be disposed within the cavity 56, and the battery pack 22 may be disposed on the tray 54. Although not shown, the tray 54 and assembled battery disconnect unit 26, cooling hose 48, and battery pack 22 may be attached to an undercarriage of the device 14.

Referring again to the plurality of bus bars 18 shown in FIG. 2, the plurality of bus bars 18 may be shaped or configured to maximize packaging space within the battery disconnect unit 26 and contact with the cooling plate 28. For example, referring to circled portion 5 of FIG. 2, one or more portions 30 of each of the plurality of bus bars 18 may extend toward the cooling plate 28 to act as a thermal via. In another example, at least one of the plurality of bus bars 18 may have an end 130 extending out of the cavity 56 towards the battery pack 22. Further, the end 130 may be electrically connected to each of the plurality of rechargeable batteries 16.

Figure 4:
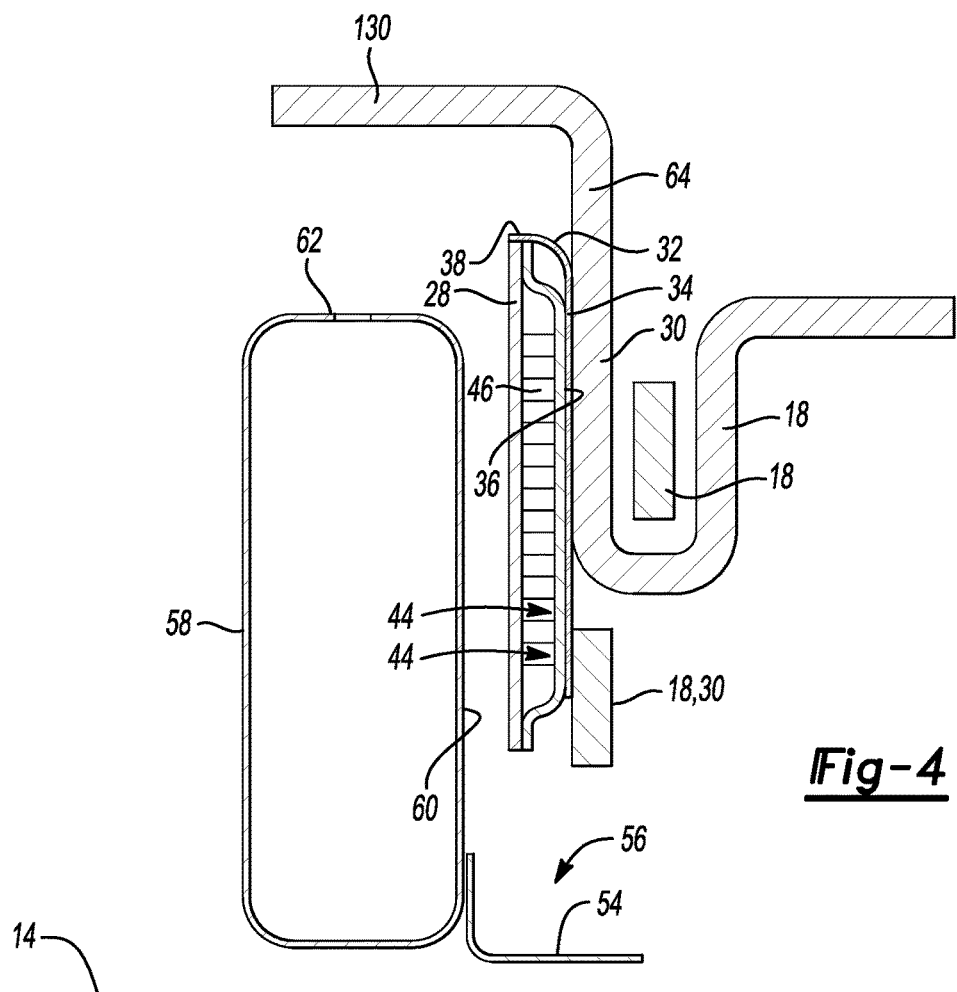
FIG. 4 is a schematic illustration of a cross-sectional view of the cooling system of FIGS. 2 and 3 taken along section line 4-4.

In one embodiment shown in FIG. 4, the tray 54 may include a divider 58 having a wall surface 60 and a rear edge 62 extending from and substantially perpendicular to the wall surface 60. At least one of the plurality of bus bars 18 may have a first portion 64 that is substantially parallel to the wall surface 60 and the end 130 that extends from and is substantially perpendicular to the first portion 64. That is, the end 130 may be substantially parallel to the rear edge 62. As such, the plurality of bus bars 18 may be configured to extend from the battery disconnect unit 26 in a unique configuration that maximizes electrical connectivity and thermal conduction with the cooling plate 28.

Figure 5A:
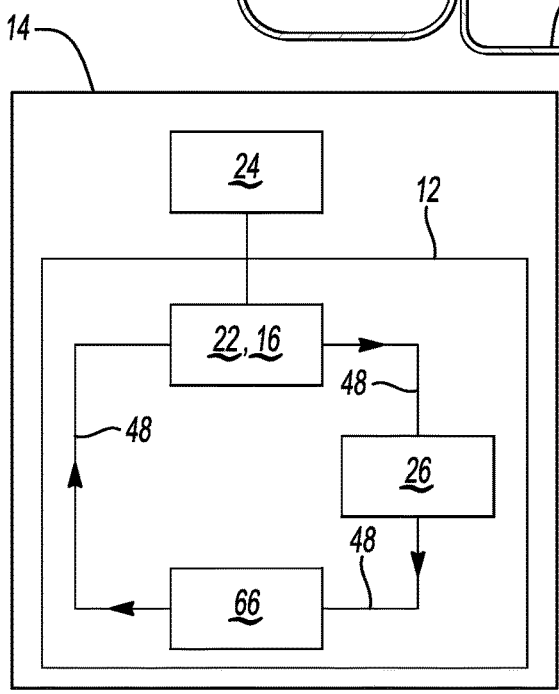
FIG. 5A is a schematic illustration of a device including the rechargeable energy storage system of FIG. 1, wherein the rechargeable energy storage system operates in a mode that provides power to a driven component.

Referring now to FIG. 5A, the rechargeable energy storage system 12 may also include a coolant pump 66 connected to the cooling hose 48. The coolant pump 66, which may optionally include a chiller, may be configured for reversing a flow of fluid 46 through the cooling hose 48 and the cooling plate 28 from the plurality of rechargeable batteries 16 to the plurality of contactors 20 (FIG. 2) to thereby warm the plurality of contactors 20. That is, during the EV mode of operation in which the rechargeable energy storage system 12 provides power to the driven member 24 of the device 14, the fluid 46 may flow from the coolant pump 66 through the cooling hose 48 to the battery pack 22 and individual rechargeable batteries 16 to thereby remove heat from the individual rechargeable batteries 16 via conduction and cool the battery pack 22. Thereafter, the warmed fluid 46 may flow through the battery disconnect unit 26 via the second outlet 52 of the cooling hose 48 and the first inlet 40 of the cooling plate 28, through the plurality of channels 44 defined by the cooling plate 28, and through the first outlet 42 and the second inlet 50 to thereby remove heat from the plurality of bus bars 18 via conduction. Finally, the comparatively warmer fluid 46 may travel back through the cooling hose 48 to the coolant pump 66.

Figure 5B:
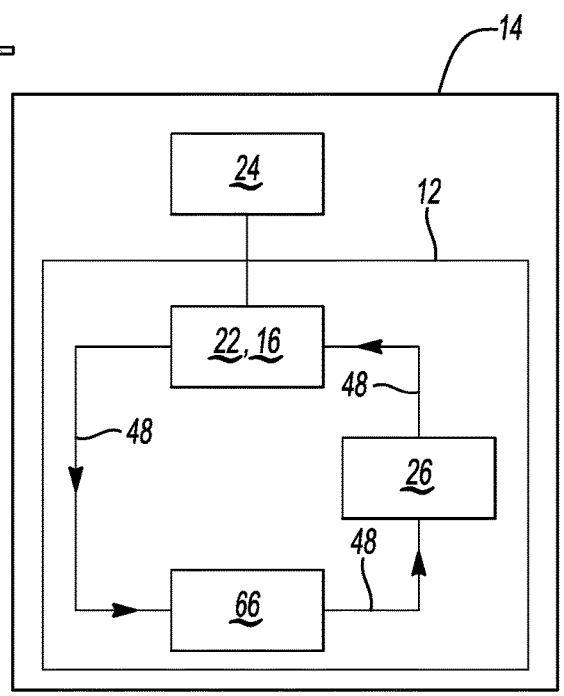
FIG. 5B is a schematic illustration of the device of FIG. 5A, wherein the battery pack of the rechargeable energy storage system operates in a charging mode.

Conversely, referring to FIG. 5B, during a charging mode of operation in which the rechargeable energy storage system 12 is charging from an electrical supply in comparatively cold temperatures or after a period of non-use and is not providing power to the driven member 24 of the device 14, the flow of fluid 46 may reverse. That is, the fluid 46 may flow from the coolant pump 66, through the cooling hose 48 to the battery disconnect unit 26 via the first outlet 42 of the cooling hose 48 and the second inlet 50 of the cooling plate 28, through the plurality of channels 44 defined by the cooling plate 28, and through the second outlet 52 and the first inlet 40 to thereby remove heat from the plurality of bus bars 18 via conduction. Thereafter, the warmed fluid 46 may travel from the battery disconnect unit 26 to the battery pack 22 to thereby warm the individual rechargeable batteries 16 via conduction. After some heat is removed from the fluid 46 by the individual rechargeable batteries 16, the comparatively cooler fluid 46 then may return to the coolant pump 66. Such reversed fluid flow may be useful for heating the battery pack 22 during, for example, a direct current fast charge mode of operation. That is, the cooling plate 28 allows heat to be efficiently transferred from the battery disconnect unit 26 and plurality of bus bars 18 to the fluid 46 for heat transfer to the rechargeable batteries 16.

In addition, although not shown, the cooling system 10 and rechargeable energy storage system 12 may further include a thermal sensing system including one or more thermal sensing components configured for monitoring, sensing, and/or controlling a temperature of one of more components of the cooling system 10. For example, the thermal sensing system may include one or more control units, processors, and temperature sensors configured to measure and control a temperature of each output path of the battery disconnect unit 26. Such one or more temperature sensors may communicate with the one or more control units and/or processors to modify a flow rate of the fluid 46 through the cooling system 10 and rechargeable energy storage system 12 to thereby maintain a desired temperature within the rechargeable energy storage system 12.

Therefore, the cooling system 10 and rechargeable energy storage system 12 may be useful for devices 14 (FIG. 5) requiring batteries 16 (FIG. 1) capable of high-power charging and high-power electrical loading. In particular, the cooling system 10 may enable the rechargeable energy storage system 12 to manage temperatures associated with high-power charging and high-power electrical loading without increasing bus bar 18 (FIG. 2) and contactor 20 (FIG. 2) size. As such, the cooling system 10 may enable a reduction of mass and increase in energy density for the rechargeable energy storage system 12. In addition, the cooling system 10 may enable reversed coolant fluid flow at times to assist with battery heating during a direct current fast charge mode of operation.

While the best modes for carrying out the disclosure have been described in detail, those familiar with the art to which this disclosure relates will recognize various alternative designs and embodiments for practicing the disclosure within the scope of the appended claims.

What is claimed is:

1. A rechargeable energy storage system comprising:
   a battery pack including a plurality of rechargeable batteries electrically connected to one another; and
   a battery disconnect unit configured for selectively disconnecting electrical power to the plurality of rechargeable batteries, wherein the battery disconnect unit is selectively disposed in electrical communication with the battery pack and includes:
      a plurality of contactors each configured as an electrically controlled switch and including at least one of a main positive contactor, a direct current fast charge contactor, a pre-charge contactor, and a main negative contactor;
      a cooling system including:
         a plurality of bus bars electrically connected to one another and configured for electrically interconnecting the plurality of contactors;
         wherein at least one of the plurality of bus bars extends from the battery disconnect unit toward the battery pack;
         a cooling plate configured for cooling the plurality of bus bars and disposed in a thermally-conductive relationship with a portion of each of the plurality of bus bars; and
         an isolation component disposed between and in contact with the cooling plate and each of the plurality of bus bars;

a cooling hose configured for cooling the battery pack and the battery disconnect unit with a fluid and disposed in fluid communication with the cooling plate; and a coolant pump connected to the cooling hose and configured for reversing a flow of the fluid through the cooling hose and the cooling plate from the plurality of rechargeable batteries to the plurality of contactors to thereby warm the plurality of contactors;

wherein the rechargeable energy storage system is transitionable between:

an electric vehicle mode of operation in which the fluid flows from the coolant pump through the cooling hose to the battery pack and to individual ones of the plurality of rechargeable batteries to thereby remove heat from the individual ones of the plurality of rechargeable batteries via conduction, cool the battery pack, and form a warmed fluid that flows through the battery disconnect unit via the cooling hose and the cooling plate to thereby remove heat from the plurality of bus bars via conduction and then travels back through the cooling hose to the coolant pump; and a charging mode of operation in which the fluid flows from the coolant pump, through the cooling hose to the battery disconnect unit, and through the cooling plate to thereby remove heat from the plurality of bus bars via conduction and form the warmed fluid that travels from the battery disconnect unit to the battery pack to thereby warm individual ones of the plurality of rechargeable batteries via conduction and then returns to the coolant pump.

2. The rechargeable energy storage system of claim 1, wherein the cooling plate has a first face disposed opposite and parallel to the portion of each the plurality of bus bars, and further wherein the isolation component is disposed along an entirety of the first face.

3. The rechargeable energy storage system of claim 2, wherein the cooling plate has a top end adjacent the first face, and further wherein the isolation component contacts and wraps over the top end.

4. The rechargeable energy storage system of claim 1, wherein the isolation component includes at least one thermally-conductive layer disposed between and in contact with the cooling plate and each of the plurality of bus bars.

5. The rechargeable energy storage system of claim 1, wherein the cooling plate is electrically isolated from each of the plurality of bus bars.

6. The rechargeable energy storage system of claim 1, wherein the cooling plate has a first inlet and a first outlet and defines a plurality of channels therein between the first inlet and the first outlet.

7. The rechargeable energy storage system of claim 6, wherein the plurality of channels are disposed in fluid communication with the cooling hose.

8. The rechargeable energy storage system of claim 6, wherein the cooling hose has a second inlet disposed in fluid communication with the first outlet and a second outlet disposed in fluid communication with the first inlet.

9. The rechargeable energy storage system of claim 1, further including a tray defining a cavity therein, wherein the battery disconnect unit and the cooling hose are disposed within the cavity and the battery pack is disposed on the tray.

10. The rechargeable energy storage system of claim 9, wherein at least one of the plurality of bus bars has an end extending out of the cavity towards the battery pack.

11. The rechargeable energy storage system of claim 10, wherein the end is electrically connected to each of the plurality of rechargeable batteries.

12. The rechargeable energy storage system of claim 9, wherein the tray includes a divider having a wall surface and a rear edge extending from and substantially perpendicular to the wall surface.

13. The rechargeable energy storage system of claim 12, wherein at least one of the plurality of bus bars has:
a first portion that is substantially parallel to the wall surface; and
an end that extends from and is substantially perpendicular to the first portion, and is substantially parallel to the rear edge.

14. The rechargeable energy system of claim 1, wherein at least one of the plurality of contactors is a direct current contactor configured for charging the plurality of rechargeable batteries with an electrical current of from 300 A to 500 A.

15. The rechargeable energy storage system of claim 14, wherein the battery pack is electrically connected to and configured for powering a device with the electrical current of from 1,000 Amperes to 1,300 Amperes.

16. A device comprising:
a driven component; and
a rechargeable energy storage system configured for providing power to the driven component, wherein the rechargeable energy storage system includes:
a battery pack having a plurality of rechargeable batteries electrically connected to one another;
a battery disconnect unit configured for selectively disconnecting electrical power to the plurality of rechargeable batteries, wherein the battery disconnect unit is selectively disposed in electrical communication with the battery pack and includes:
a plurality of contactors each configured as an electrically controlled switch and including at least one of a main positive contactor, a direct current fast charge contactor, a pre-charge contactor, and a main negative contactor; and
a cooling system including:
a plurality of bus bars electrically connected to the battery pack and to one another;
wherein at least one of the plurality of bus bars extends from the battery disconnect unit toward the battery pack;
a cooling plate configured for cooling the plurality of bus bars and disposed in a thermally-conductive relationship with a portion of each of the plurality of bus bars; and
an isolation component disposed between and in contact with the cooling plate and each of the plurality of bus bars;
a cooling hose configured for cooling the battery pack and the battery disconnect unit with a fluid and disposed in fluid communication with the cooling plate; and
a coolant pump connected to the cooling hose and configured for reversing a flow of the fluid through the cooling hose and the cooling plate from the plurality of rechargeable batteries to the plurality of contactors to thereby warm the plurality of contactors;
wherein the rechargeable energy storage system is transitionable between:
an electric vehicle mode of operation wherein the rechargeable energy storage system provides power to the driven component and in which the fluid flows from the coolant pump through the cooling hose to the battery pack and to individual ones of the plurality of rechargeable batteries to thereby remove heat from the individual ones of the plurality of rechargeable batteries via conduction, cool the battery pack, and form a warmed fluid that flows through the battery disconnect unit via the cooling hose and the cooling plate to thereby remove heat from the plurality of bus bars via conduction and then travels back through the cooling hose to the coolant pump; and a charging mode of operation wherein the rechargeable energy storage system is not providing power to the driven component and in which the fluid flows from the coolant pump, through the cooling hose to the battery disconnect unit, and through the cooling plate to thereby remove heat from the plurality of bus bars via conduction and form the warmed fluid that travels from the battery disconnect unit to the battery pack to thereby warm individual ones of the plurality of rechargeable batteries via conduction and then returns to the coolant pump.

17. The device of claim 16, wherein the cooling plate has a first inlet and a first outlet and defines a plurality of channels therein each configured for conveying the fluid through the cooling plate between the first inlet and the first outlet to thereby conduct thermal energy away from the plurality of bus bars.

18. The device of claim 16, wherein the cooling plate is electrically isolated from each of the plurality of bus bars by the isolation component.

* * * * *